United States Patent [19]

Bischof et al.

[11] Patent Number: 6,006,622

[45] Date of Patent: Dec. 28, 1999

[54] TRANSMISSION GEAR ARRANGEMENT FOR COMPENSATING PLAY AT THE TOOTH FLANKS

[75] Inventors: Peter Bischof, Heideck; Klaus Mitterleitner; Thomas Ringholz, both of Munich, all of Germany

[73] Assignee: Bayerische Motoren Werke Aktiengesellschaft, Munich, Germany

[21] Appl. No.: 09/081,571

[22] Filed: May 19, 1998

[30] Foreign Application Priority Data

May 26, 1997 [DE] Germany ............ 197 21 852

[51] Int. Cl.$^6$ .................................. F16H 55/18
[52] U.S. Cl. .............................. 74/440; 74/409
[58] Field of Search ........................ 74/409, 440

[56] References Cited

U.S. PATENT DOCUMENTS

| | | | |
|---|---|---|---|
| 2,640,428 | 6/1953 | Houghton | 74/440 X |
| 2,902,879 | 9/1959 | Andersen | 74/440 |
| 3,373,627 | 3/1968 | Wesstrom | 74/440 |

FOREIGN PATENT DOCUMENTS

| | | |
|---|---|---|
| 166301A1 | 1/1986 | European Pat. Off. . |
| 1004879 | 3/1957 | Germany . |
| 1217728 | 5/1966 | Germany . |
| 1625006 | 5/1970 | Germany . |
| 7400276 | 1/1974 | Germany . |
| 8611098 | 8/1986 | Germany . |
| 823717 | 4/1981 | U.S.S.R. ............ 74/440 |

OTHER PUBLICATIONS

Patent Abstracts of Japan, vol. 018 No. 183, Mar. 29, 1994.
European Search Report, Jul. 30, 1999, EP98106635.
Search Report Oct. 1997, DEX.

*Primary Examiner*—Allan D. Herrmann
*Attorney, Agent, or Firm*—Evenson McKeown Edwards & Lenahan, PLLC

[57] ABSTRACT

A transmission gear is composed of two gear elements provided with teeth on their circumference. The gear elements are displaceable coaxially in the circumferential direction and with their teeth offset with respect to one another. The elements are also connected with one another shapewise by at least one connecting member in such fashion that when a meshing gear engages the gear elements, the existing tooth flank play is reduced or eliminated. In this way the connecting member connects the gear elements so that they are nondisplaceable with respect to one another in the circumferential direction and causes the displacement of the gear elements with respect to one another by virtue of its thermal expansion.

14 Claims, 1 Drawing Sheet

TRANSMISSION GEAR ARRANGEMENT FOR COMPENSATING PLAY AT THE TOOTH FLANKS

BACKGROUND AND SUMMARY OF THE INVENTION

This application claims the priority of German application 197 21 852.0, filed May 26, 1997 in Germany, the disclosure of which is expressly incorporated by reference herein.

Gear transmissions that operate with zero play are already known in which one gear of a pair of gears that mesh with one another consists of two tooth crowns, one of which transmits the torque while the other compensates for play, said crowns being biased against one another by a spring in the circumferential direction, i.e. movably connected with one another. German Utility Model 74 00 276 describes such a gear transmission, with a gear composed of two gear elements biased against one another.

Previously known engine and transmission designs however suffer from the problem that the housings have thermal expansion characteristics that differ from those of the shafts, bearings, and gears that are employed. This is especially true when steel gears are used in aluminum housings.

Even when gears with very little tooth flank play at ambient temperatures of about 20° C. are deliberately installed, the change in axial spacing that takes place at higher operating temperatures results in a significant increase in tooth flank play. As a result, a clearly perceptible rattling noise can develop.

For this reason, the tooth flank play of a pair of gears that mesh with one another is compensated by an additional gear element mounted coaxially to a gear, said gear element being biased by one or more springs and urged movably in the circumferential direction against the gear.

This has the disadvantage that usually only the idle noise of the gears that are in mesh is influenced in a positive manner. Effective compensation can occur in only one load direction. When loads change, the spring is subjected to excess pressure and thus the rear tooth flank comes in contact. During coasting, this usually means that a rattling noise results. It is also disadvantageous that the spring force produces increased friction on the tooth flanks, which usually is manifested by a squeaking sound.

Therefore a goal of the invention is to provide a transmission gear that compensates for tooth flank play in a pair of gears in a specific manner regardless of the spring forces and thus independently of the torque being transmitted at a given moment by the pair of gears.

This goal is achieved according to preferred embodiments of the invention by providing a transmission gear composed of at least two gear elements provided with teeth on their circumference, said elements being displaceable coaxially in the circumferential direction, with their teeth offset with respect to one another, and connected shapewise with one another by at least one connecting member in such fashion that for engagement of a meshing gear, the existing tooth flank play is reduced or eliminated, wherein the connecting member connects the gear elements so that they are not displaceable in the circumferential direction and, by its thermal expansion, causes shifting of the gear elements with respect to one another in the circumferential direction.

According to the invention, a transmission gear assembly includes of at least. two gear elements provided with teeth on their circumference, said gear elements being displaceable coaxially in the circumferential direction and having teeth that are offset with respect to one another, and connected shapewise with one another by at least one connecting member in such fashion that the existing tooth flank play is reduced or eliminated in order to engage a meshing gear, with the connecting member connecting the gear elements nondisplaceably with one another in the circumferential direction and, by virtue of its thermal expansion, causing shifting of the gear elements with respect to one another in the circumferential direction.

When the gear elements that are mounted displaceably with respect to one another are firmly connected with one another by a connecting member, this has the advantage that their shifting relative to one another is based on a deliberate utilization of different coefficients of thermal expansion of the materials used for the gear elements and the connecting member. In this way, the tooth flank play that results from differences in thermal expansion between the gears and the transmission housing can be compensated extremely well. The connecting member between the gear elements can consist either of a material that has a degree of thermal expansion that is deliberately greater or deliberately smaller than that of the gear elements. By careful positioning and length of the connecting member, complete tooth flank play compensation or clearly reduced tooth flank play can be achieved over the entire operating temperature range from less than −40° C. to far above 200° C.

Advantageously, the gear elements are not tensioned against the gear with which they mesh, but only the play between the toothed flanks is compensated. For this reason, the frictional losses are significantly less than when tooth flank play compensation is performed by spring force. This also has a positive effect on efficiency and wear in the transmission.

In addition, tooth flank play compensation according to the invention is ensured in both directions of rotation of the gear pair. As a result, the rattling noises produced during coasting as well as nonuniformity of rotation are reduced.

In preferred embodiments of the invention, the connecting member is a pull-push rod. This has the advantage that the twist angle between the two gear elements at a given temperature can be determined in advance in simple fashion.

Another advantageous feature of preferred embodiments of the invention is that the connecting member is mounted like a chord between the two gear elements and is connected shapewise at each end with a respective gear element.

A transmission gear constructed according to the invention is also advantageously easy to manufacture.

Other objects, advantages and novel features of the present invention will become apparent from the following detailed description of the invention when considered in conjunction with the accompanying drawings.

DETAILED DESCRIPTION OF THE DRAWINGS

Figure 1:
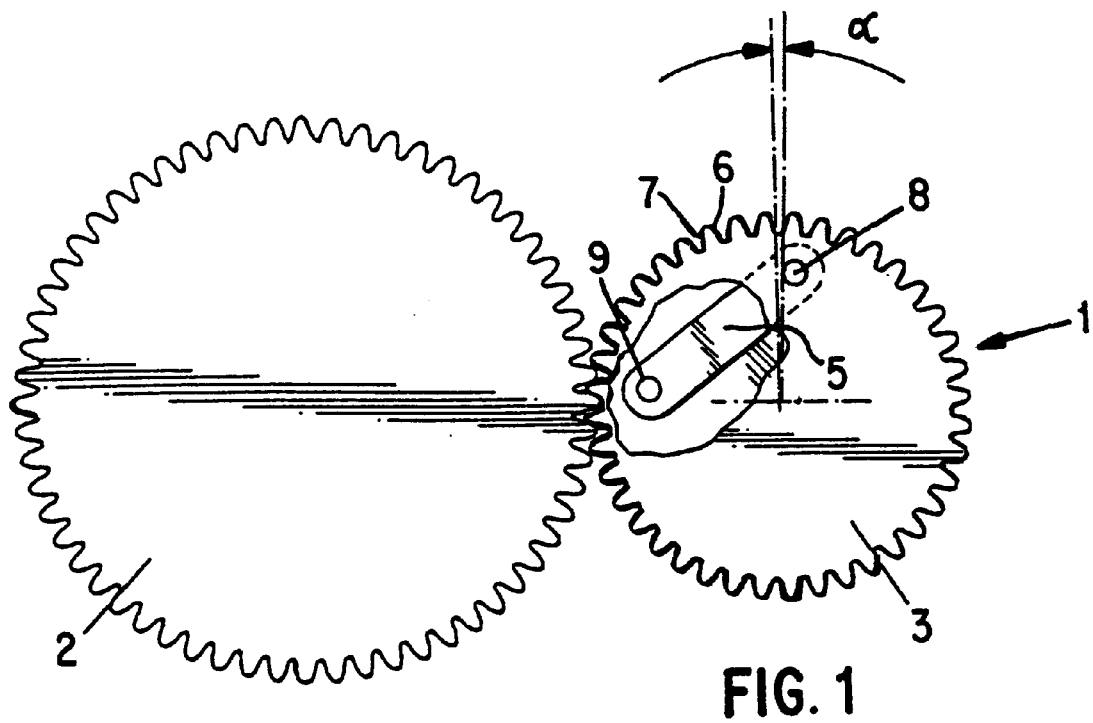
FIG. 1 is a schematic view of a pair of gears, taken in a direction of the gear axes and showing a preferred embodiment of the invention.

In FIG. 1, a transmission gear 1 meshes with a gear 2. Transmission gear 1 is composed of two gear elements 3, 4 that are provided with teeth around their circumference, said elements, displaced coaxially in a circumferential direction and with their teeth offset, being connected with one another by a no connecting member 5. The teeth of gear elements 3, 4 of transmission gear 1 that are offset with respect to one another are shown in the drawing by twist angle a that shows how the individual tooth flanks 6, shown schematically and offset, of the teeth of gear elements 3 and 7 are offset with respect to the teeth of gear element 4. Although only the edges of the outline are actually visible in a view as shown in FIG. 1, the invisible lines are also deliberately drawn for improved understanding in the schematic diagram of tooth flanks 6, 7.

In transmission gear 1, likewise to improve understanding, connecting member 5 is indicated by a solid break line. This member 5 is connected shapewise by a pin 8 with gear element 3, and also by a pin 9 with gear element 4. The two pins 8 and 9 connect the ends of connecting member 5 with the respective gear elements 3 and 4.

Figure 2:
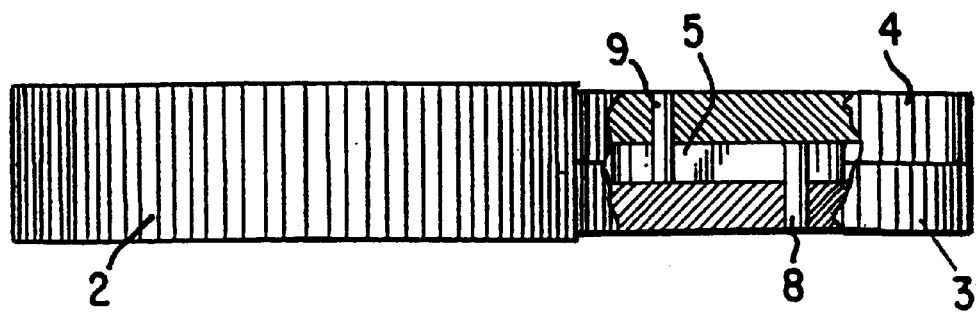
FIG. 2 is a view of the pair of gears in FIG. 1, taken in a direction transverse to the gear axes.

This connection of the connecting member 5 is shown in greater detail in FIG. 2. Gear 2 meshes with the two gear elements 3 and 4. Between these gear elements 3 and 4, connecting member 5 in the form of a pull-push rod, is connected like a chord (along a chord) with gear elements 3, 4. The shapewise connection is achieved by virtue of the fact that halves or axial end parts of pin 8 project into respective aligned bores in gear element 3 and in connecting member 5, while pin 9 connects gear element 4 with connecting member 5 in the same way.

If connecting member 5 expands lengthwise as the temperature rises, the two gear elements 3 and 4 are displaced relative to one another in such fashion that tooth flank play with respect to gear 2 is reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Transmission gear composed of at least two gear elements provided with teeth on their circumference, said elements being displaceable coaxially in the circumferential direction, with their teeth offset with respect to one another, and connected shapewise with one another by at least one connecting member in such fashion that for engagement of a meshing gear, the existing tooth flank play is reduced or eliminated, wherein the connecting member directly connects the gear elements without interposition of spring elements so that the gear elements are not displaceable in the circumferential direction and, by its thermal expansion, causes shifting of the gear elements with respect to one another in both circumferential directions.

2. Transmission gear according to claim 1, wherein the connecting member is a pull-push rod.

3. Transmission gear according to claim 1, wherein the connecting member is mounted as a chord between the two gear elements and is connected shapewise at each end with a respective one of the gear elements.

4. Transmission gear according to claim 2, wherein the connecting member is mounted as a chord between the two gear elements and is connected shapewise at each end with a respective one of the gear element.

5. A gear assembly comprising:

a meshing gear wheel having circumferential meshing gear teeth;

a transmission gear unit composed of a plurality of coaxially arranged transmission gear wheel members having circumferential transmission gear teeth engageable in use with the meshing gear teeth, said transmission gear wheel members being circumferentially displaceable with respect to one another to minimize tooth play between the meshing gear teeth and the transmission gear teeth, and a connecting member directly connecting respective transmission gear wheel members together without interposition of spring elements, said connecting member being configured to thermally expand and contract to thereby move the transmission gear wheel members relative to one another in both circumferential directions to maintain minimal tooth play during changing temperature conditions.

6. A gear assembly according to claim 5, wherein the connecting member is a pull-push rod.

7. A gear assembly according to claim 5, wherein the connecting member is mounted as a chord between the two gear elements and is connected shapewise at each end with a respective one of the gear element.

8. A gear assembly according to claim 6, wherein the connecting member is mounted as a chord between the two gear elements and is connected shapewise at each end with a respective one of the gear elements.

9. Transmission gear composed of at least two gear elements provided with teeth on their circumference, said elements being displaceable coaxially in the circumferential direction, with their teeth offset with respect to one another, and connected shapewise with one another by at least one connecting member in such fashion that for engagement of a meshing gear, the existing tooth flank play is reduced or eliminated, wherein the connecting member connects the gear elements so that they are not displaceable in the circumferential direction and, by its thermal expansion, causes shifting of the gear elements with respect to one another in the circumferential direction, and wherein the connecting member is a pull-push rod.

10. Transmission gear according to claim 9, wherein the connecting member is mounted as a chord between the two gear elements and is connected shapewise at each end with a respective one of the gear elements.

11. Transmission gear composed of at least two gear elements provided with teeth on their circumference, said elements being displaceable coaxially in the circumferential direction, with their teeth offset with respect to one another, and connected shapewise with one another by at least one connecting member in such fashion that for engagement of a meshing gear, the existing tooth flank play is reduced or eliminated, wherein the connecting member connects the gear elements so that they are not displaceable in the circumferential direction and, by its thermal expansion, causes shifting of the gear elements with respect to one another in the circumferential direction, and wherein the connecting member is mounted as a chord between the two gear elements and is connected shapewise at each end with a respective one of the gear elements.

12. A gear assembly comprising:

a meshing gear wheel having circumferential meshing gear teeth;

a transmission gear unit composed of a plurality of coaxially arranged transmission gear wheel members having circumferential transmission gear teeth engageable in use with the meshing gear teeth, said transmission gear wheel members being circumferentially displaceable with respect to one another to minimize tooth play between the meshing gear teeth and the transmission gear teeth, and a connecting member connecting respective transmission gear wheel members together, said connecting member being configured to thermally expand and contract to thereby move the transmission gear wheel members relative to one another to maintain minimal tooth play during changing temperature conditions, wherein the connecting member is a pull-push rod.

13. A gear assembly according to claim 12, wherein the connecting member is mounted as a chord between the two gear elements and is connected shapewise at each end with a respective one of the gear elements.

14. A gear assembly comprising:

a meshing gear wheel having circumferential meshing gear teeth;

a transmission gear unit composed of a plurality of coaxially arranged transmission gear wheel members having circumferential transmission gear teeth engageable in use with the meshing gear teeth, said transmission gear wheel members being circumferentially displaceable with respect to one another to minimize tooth play between the meshing gear teeth and the transmission gear teeth, and a connecting member connecting respective transmission gear wheel members together, said connecting member being configured to thermally expand and contract to thereby move the transmission gear wheel members relative to one another to maintain minimal tooth play during changing temperature conditions, wherein the connecting member is mounted as a chord between the two gear elements and is connected shapewise at each end with a respective one of the gear elements.

* * * * *